(12) United States Patent
Martin et al.

(10) Patent No.: US 9,094,314 B2
(45) Date of Patent: Jul. 28, 2015

(54) SYSTEM AND METHOD FOR ACCESS POINT (AP) AGGREGATION AND RESILIENCY IN A HYBRID WIRED/WIRELESS LOCAL AREA NETWORK

(71) Applicant: BROADCOM CORPORATION, Irvine, CA (US)

(72) Inventors: Richard Martin, Ontario (CA); Yong Kim, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 21 days.

(21) Appl. No.: 13/968,595

(22) Filed: Aug. 16, 2013

(65) Prior Publication Data

US 2013/0336123 A1   Dec. 19, 2013

Related U.S. Application Data

(63) Continuation of application No. 10/658,450, filed on Sep. 9, 2003, now abandoned.

(60) Provisional application No. 60/435,977, filed on Dec. 20, 2002, provisional application No. 60/411,261, filed on Sep. 17, 2002, provisional application No. 60/411,301, filed on Sep. 17, 2002, provisional application No. 60/435,984, filed on Dec. 20, 2002.

(51) Int. Cl.
*H04W 4/00* (2009.01)
*H04L 12/24* (2006.01)
(Continued)

(52) U.S. Cl.
CPC ........ *H04L 41/0896* (2013.01); *H04L 12/5695* (2013.01); *H04L 47/125* (2013.01); *H04L 47/14* (2013.01); *H04L 47/20* (2013.01); *H04L 47/2416* (2013.01); *H04L 47/728* (2013.01); *H04L 47/746* (2013.01); *H04L 47/762* (2013.01); *H04L 47/767* (2013.01); *H04L 47/805* (2013.01); *H04L 47/824* (2013.01); *H04L 47/828* (2013.01); *H04L 49/351* (2013.01); *H04L 63/10* (2013.01); *H04L 69/40* (2013.01); *H04L 1/1607* (2013.01);
(Continued)

(58) Field of Classification Search
CPC ............ H04L 41/0896; H04L 47/2408; H04L 12/5695; H04L 67/14; H04L 43/0876; H04L 45/42; H04L 47/41; H04L 67/1089
USPC .......................................................... 370/338
See application file for complete search history.

(56) References Cited

U.S. PATENT DOCUMENTS 6,452,910 B1 * 9/2002 Vij et al. ...................... 370/310
2003/0210671 A1 * 11/2003 Eglin ............................ 370/338

*Primary Examiner* — Kwasi Karikari
(74) *Attorney, Agent, or Firm* — Garlick & Markison; Randy W. Lacasse

(57) ABSTRACT

Aspects of the invention may provide a system and method for access point aggregation and resiliency in a hybrid wired/wireless local area network. Access point aggregation and resiliency may include determining one or more available switch ports having a capability to handle a first access point group, the first access point group having a first default switch port. One or more available switch ports may be provisioned to provide service to the first access point group. Information may be communicated between the first default switch port and/or any of the provisioned switch ports, while maintaining client status and connection information. Available switch ports may be selected from a reserved pool of available switch ports and upon abatement of a need to utilize the provisioned switch ports, the provisioned switch ports may be returned to the reserved pool of available switch ports.

20 Claims, 12 Drawing Sheets

(51) Int. Cl.

| | |
|---|---|
| *H04L 12/54* | (2013.01) |
| *H04L 12/803* | (2013.01) |
| *H04L 12/801* | (2013.01) |
| *H04L 12/813* | (2013.01) |
| *H04L 12/853* | (2013.01) |
| *H04L 12/911* | (2013.01) |
| *H04L 12/923* | (2013.01) |
| *H04L 12/919* | (2013.01) |
| *H04L 12/927* | (2013.01) |
| *H04L 12/931* | (2013.01) |
| *H04L 29/06* | (2006.01) |
| *H04L 29/14* | (2006.01) |
| *H04L 1/16* | (2006.01) |
| *H04W 28/08* | (2009.01) |
| *H04W 36/00* | (2009.01) |
| *H04W 84/12* | (2009.01) |
| *H04W 88/08* | (2009.01) |
| *H04L 29/08* | (2006.01) |

(52) U.S. Cl.
CPC ............... *H04L 69/32* (2013.01); *H04W 28/08* (2013.01); *H04W 36/0055* (2013.01); *H04W 84/12* (2013.01); *H04W 88/08* (2013.01)

ured to adapt and map services provided by the physical layer 102 to the functions provided by the device specific PMD sublayer 102a.

SYSTEM AND METHOD FOR ACCESS POINT (AP) AGGREGATION AND RESILIENCY IN A HYBRID WIRED/WIRELESS LOCAL AREA NETWORK

CROSS-REFERENCE TO RELATED APPLICATIONS/INCORPORATION BY REFERENCE

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 10/658,450, entitled "System and Method for Access Point (AP) Aggregation and Resiliency in a Hybrid Wired/Wireless Local Area Network," filed Sep. 9, 2003, abandoned, which claims priority pursuant to 35 U.S.C. §119(e) to the following U.S. Provisional Patent Applications which are hereby incorporated herein by reference in their entirety and made part of the present U.S. Utility Patent Application for all purposes:

a. U.S. Provisional Application Ser. No. 60/435,984 entitled "Communication System and Method in a Wireless Local Area Network" filed on Dec. 20, 2002;

b. U.S. Provisional Patent Application Ser. No. 60/435,977 entitled "System and Method for Optimal Access Point (AP) Aggregation and Resiliency in a Hybrid Wired/Wireless Local Area Network" filed on Dec. 20, 2002;

c. U.S. Provisional Patent Application Ser. No. 60/411,301 entitled "Method and System for Providing a Scalable Integrated Switch and Wireless Architecture" filed on Sep. 17, 2002; and d. U.S. Provisional Patent Application Ser. No. 60/411,261 entitled "Communications Systems Software and Protocols" filed on Sep. 17, 2002.

The above stated applications are incorporated herein by reference in their entirety.

FIELD OF THE INVENTION

Embodiments of the present application relate generally to local area networks, and more particularly to a communication method and system for providing a resilient hybrid wired/wireless local area network (WLAN).

BACKGROUND OF THE INVENTION

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108, layer 3, a network layer 106; layer 2: a data link layer 104; and layer 1, a physical layer 102. The physical layer 102 may further include a physical layer convergence procedure (PLCP) sublayer 102b and a physical media dependent sublayer 102a. The data link layer 104 may also include a Medium access control (MAC) sublayer 104a.

In general, each OSI layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLCP sublayer 102b may be configured to adapt and map services provided by the physical layer 102 to the functions provided by the device specific PMD sublayer 102a.

Specifically, the PLCP sublayer 102b may be adapted to map PHY sublayer service data units (PDSUs) into a suitable packet and/or framing format necessary for providing communication services between two or more entities communicating via the physical medium. The PMD sublayer 102a specifies the actual methodology and/or protocols which may be used for receiving and transmitting via the physical medium. The MAC sublayer 104a may be adapted to provide, for example, any necessary drivers which may be utilized to access the functions and services provided by the PLCP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 801.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSSS), infrared (IR) communication, high rate direct sequence spread spectrum spread spectrum (HR-DSS) and orthogonal frequency division multiplexing (OFDM). The 802.11 standard also provides a PLCP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are four (4) standards in the in the suite of specifications, namely 802.11b, 802.11a and 802.11g which have been adapted to facilitate the demands for increased data rates. The 802.11g standard for example, may be adapted to provide a maximum data rate of about 54 Mbps at a transmitter/receiver range of 19 meters (m) in a frequency range of 2.4 GHz to 2.4835 GHz. The 802.11b standard for example, may be adapted to provide a maximum data rate of about 11 Mbps at a transmitter/receiver range of 57 meters (m) in a frequency range of 2.4 GHz to 2.4835 GHz. Finally, the 802.11a standard for example, may be adapted to provide a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA).

CSMA/CD utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at a subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, a ready to send (RTS) and clear to send (CTS) messaging scheme is employed. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes one of two modulation formats including direct sequence spread spectrum (DSS) using differential binary phase shift keying and frequency hopping spread spectrum (11-bit Barker sequence), 802.11b utilizes a higher data rate form of DSS called complementary code keying (CCK). CCK permits higher data rate and particularly less susceptible to interference effects such as multipath-propagation interference, the PSK.

802.11a utilizes orthogonal frequency-division multiplexing (OFDM) modulation/encoding scheme, which provides a maximum data rate 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11b compliant access point.

Furthermore although 802.11g compatible equipment operates in the 2.4 GHz to 2.4835 GHz frequency range, a typical transmitted signal utilizes a bandwidth of approximately 30 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b and 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11b and 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a causes more attenuation resulting in a shorter operating range at a given data rate. This may significantly increase deployment cost since a larger number of access points are required to service a given service area.

In hybrid wired/wireless network systems that may utilize one or more protocols in the 802.11 suite of protocols, the mobility of access devices throughout the network may pose additional challenges for conventional switches and switching equipment. Since access devices are continuously changing their point of access to the network, conventional switches may not have the capability to control other network devices and/or entities to provide a seamless and efficient communication throughout the network. In order to satisfy subscriber demands, certain quality and minimum service standards have to be maintained by a network system. For example, subscribers may expect to be connected at least 99.9% of the time when they attempt or initiate a connection. Additionally, subscribers may be willing to accept a minimal delay of a few milliseconds whenever they may be engaged in a voice call. However, operating outside the realm of acceptable standards may significantly affect customer satisfaction and loyalty. Notwithstanding, maintaining acceptable standards may be challenging in a continuously changing network. Moreover, particularly in network systems that may handle large volumes of access device traffic, conventional switching equipment may not have the necessary resources to effectively ensure and maintain acceptable standards. Additionally, since access devices may be continuously mobile throughout the network, congestion may cause various network devices to become bottlenecks, while other network devices having available capacity may remain unutilized or underutilized. Furthermore, overload can sometimes result in performance degradation and ultimately, system failure.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention may provide a system and method for access point aggregation and resiliency in a hybrid wired/wireless local area network. A method for access point aggregation and resiliency may include the step of determining one or more available switch ports having a capability to handle a first access point group. The first access point group may have or be associated with a first default switch port. One or more available switch ports may be provisioned to provide service to the first access point group. Accordingly, information may be communicated using at least one of the first default switch port and one or more of the provisioned switch ports. Information associated with client status and/or connections may be maintained using the first default switch port and/or provisioned switch port.

The method for access point aggregation and resiliency may also include the step of selecting one or more of the available switch ports from a reserved pool of available switch ports. Upon abatement of a need to utilize the provisioned switch ports, the provisioned switch ports may be returned to the reserved pool of available switch ports. One or more of the available switch ports may be selected from a first switching element and a second switching element. The first default switch port may be associated with the first switching element.

A second available switch port capable of handling a second access point group may also be determined. The second access point group may have or be associated with a second default switch port. At least a third available switch port may be selected to provide service to the second access point group. The method may further include switching using any two of the one or more available switch ports, the second available switch port and the third available switch ports. Switching between any two ports may occur in a time period not to exceed about three to five milliseconds from a detectable link failure or a configuration change. For example, switching between the default switch port and the at least one available switch port may occur in a time period not to exceed about three to five milliseconds from a detectable link failure.

Another embodiment of the invention may provide a machine-readable storage, having stored thereon a computer program having at least one code section for access point aggregation and resiliency in a hybrid wired/wireless local area network. The at least one code section may be executable by a machine, thereby causing the machine to perform the steps as described above for access point aggregation and resiliency in a hybrid wired/wireless local area network.

Another embodiment of the invention may provide a system for access point aggregation and resiliency in a hybrid wired/wireless local area network. The system for access point aggregation and resiliency may include at least one processor adapted to determine at least one available switch port having a capability to handle a first access point group. The first access point group may have a first default switch port. The processor may be adapted to provision one or more available switch ports to provide service to the first access point group. The processor may be adapted to communicate information using the first default switch port and one or more provisioned switch ports. Information associated with client status and/or connections may be maintained using the first default switch port and/or provisioned switch port. One or more of the processors may have the capability to select one or more of the available switch ports from a reserved pool of available switch ports. Upon abatement of a need to utilize one or more of the provisioned switch ports, the processor may return the switch port to the reserved pool of available switch ports.

One or more of the processors may be further adapted to select one or more available switch ports from the first switching element and/or a second switching element. The first default switch port may be associated with the first switching element. The processor may determine a second available switch port capable of handling a second access point group. The processor may be adapted to provision at least a third available switch port to provide service to the second access point group. The processor may be configured to switch between any two of the at least one available switch port, the second available switch port and the third available switch port. Switching between any two ports may occur in a time period not to exceed about three to five milliseconds. For example, switching between the default switch port and the at least one available switch port may occur in a time period not to exceed about three to five milliseconds from a detectable link failure or a configuration change. The processor may be a switch processor, a bandwidth management controller, a quality of service controller, a load balancing controller, a session controller and a network management controller.

These and other advantages, aspects and novel features of the present invention, as well as details of an illustrated embodiment thereof, will be more fully understood from the following description and drawings.

DETAILED DESCRIPTION OF THE INVENTION

Wireless Local Area Networks (WLANs) are gaining popularity as the method of networking users in, for example, an enterprise. WLANs may provide various advantages over conventional wired LANs, including for example, user mobility, ease of installation, seamless transition between enterprises and/or telecom provider environments and connectivity in public places such as airports, libraries and conferences. Some existing WLAN solutions are intended for use in limited installations such as a home or small office. However, they are still lacking in many areas when deployment in large enterprises may be required. Accordingly, aspects of the invention provide a communication system and method for access point aggregation and resiliency in a wireless local area network In, for example, large heterogeneous networks such as an Enterprise network, there may be hundreds of access points that may require management. Each one or a group of the access points may be required to implement certain policies. The policies may include, but are not limited to, access policies, security policies and/or quality of service (QoS) policies. Individually managing each one or a group of the access points may be a daunting task that may be expensive and/or time consuming. In accordance with an aspect of the invention, a centralized server and/or a switch may be adapted to implement the policies for each of the APs, a group of APs or all of the APs. Accordingly, the server and/or switch may propagate the polices to the access points. In this regard, the server and the switch may provide a single point for implementing and distributing the policies. The switch may be a wireless local area network switch although the invention is not limited in this regard.

Access point aggregation and resiliency may include determining one or more available switch ports having a capability to handle a first access point group, the first access point group having a first default switch port. One or more available switch ports may be provisioned to provide service to the first access point group. Information may be communicated between the first default switch port and/or any of the provisioned switch ports. Available switch ports may be selected from a reserved pool of available switch ports and upon abatement of a need to utilize the provisioned switch ports, the provisioned switch ports may be returned to the reserved pool of available switch ports. Information associated with client status and connections may be maintained using the default or provisioned switch ports.

Figure 1A:
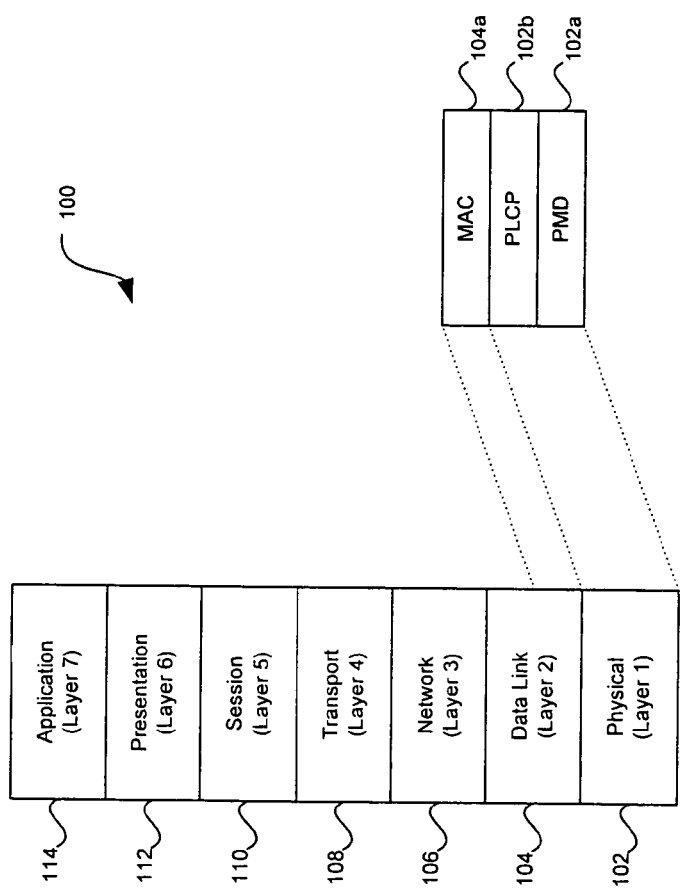
FIG. 1a is a block diagram of the OSI model.
Figure 1B:
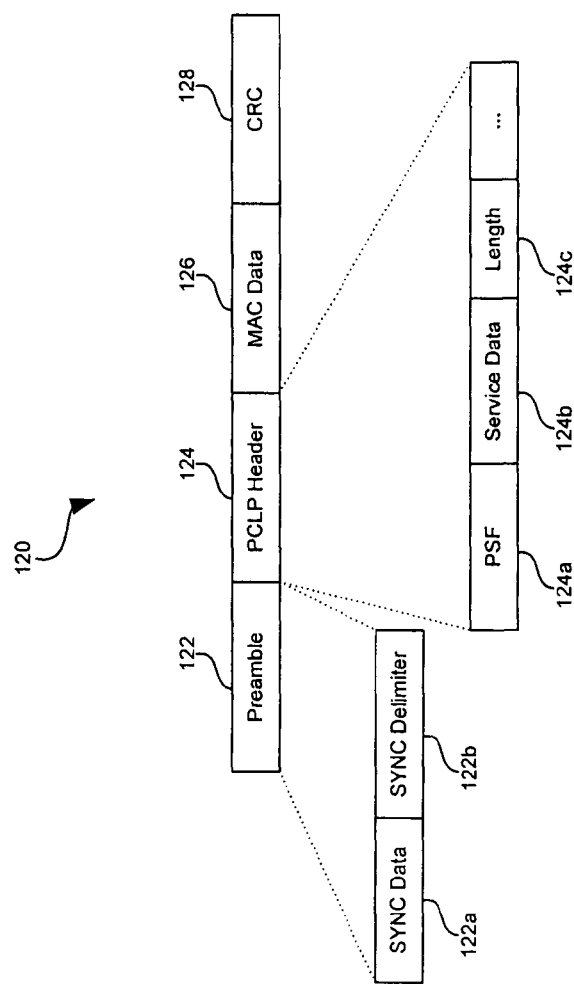
FIG. 1b is a block diagram illustrating a general PLCP frame as defined by 802.11.

FIG. 1b is a block diagram 120 illustrating a general PLCP frame as defined by 802.11. Referring to FIG. 1b, there is shown preamble 122, PLCP header 124, MAC data 126, and CRC 128. Preamble 122 may include synchronization (SYNC) data 122a and synchronization delimiter 122b. The PLCP header 124 may include, for example PCLP signal field (PSF) 124a, service data 124b, length 124c and other fields. The preamble 122 may be dependent on the PHY. The SYNC data 122a may include a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLCP header 124 may be adapted to contain information used for decoding the frame. For example, the PSF 124a may be adapted to include communication data rate information. The service data 124b is generally reserved, but may be utilized to provide application specific functionality. The length 124c may be adapted to indicate the length of the MAC data 126. In this regard, the length 124c may be expressed in terms of the time required to transmit the MAC data 126.

Figure 1C:
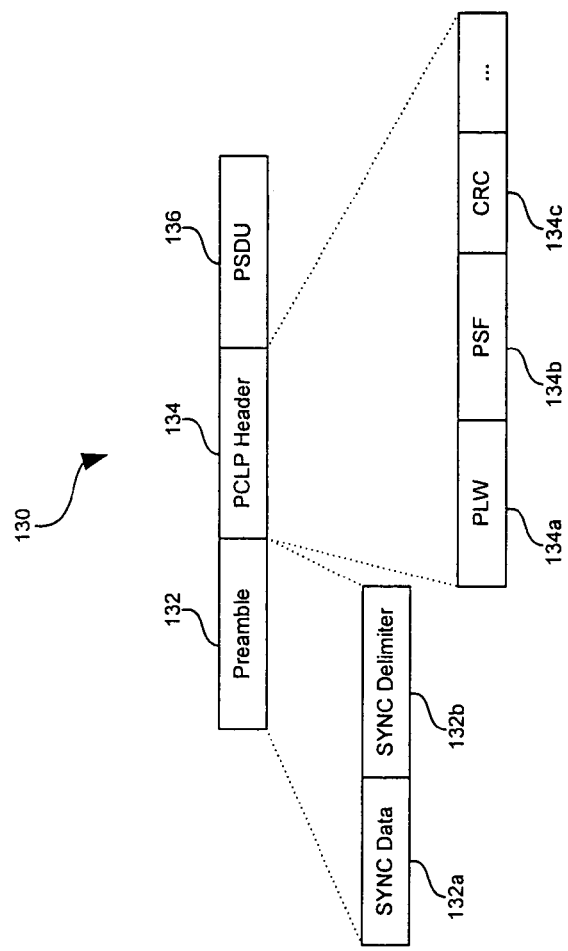
FIG. 1c is a block diagram illustrating a PLCP frame utilized by frequency hopping spread spectrum as defined by 802.11.

FIG. 1c is a block diagram 130 illustrating a PLCP frame utilized by frequency hopping spread spectrum as defined by 802.11. Referring to FIG. 1c, there is shown a SYNC data 132, PLCP header 134 and PSDU 136. The PLCP header 134 may include, for example, PSDU length word (PLW) 134a, PLCP signaling field (PSF) 134b, header error check field or CRC 134c and other fields. The PLW 134a may specify the number of octets contained in the PSDU 136. The PSF 134b be may be 4-bits in length and may be used to denote the communication data rate.

Figure 1D:
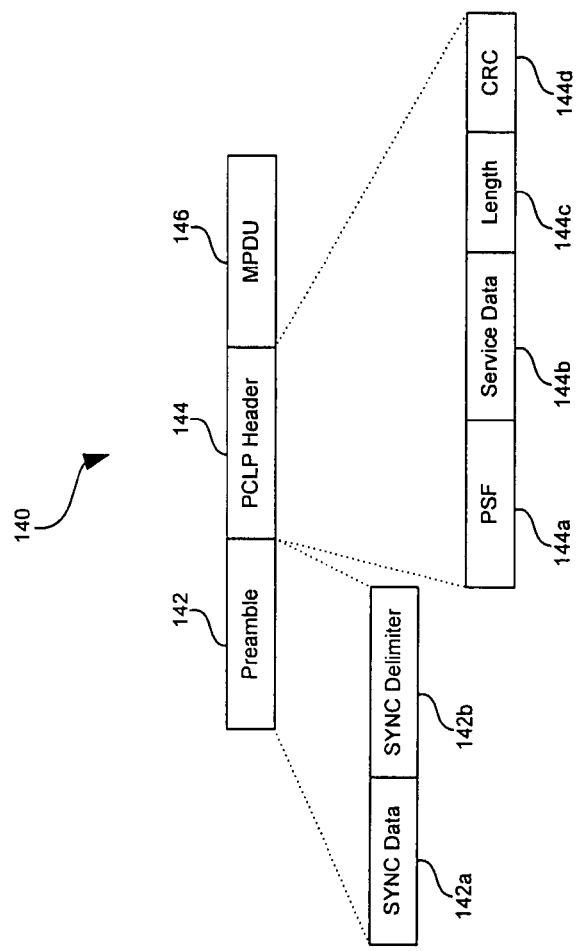
FIG. 1d is a block diagram illustrating a PLCP frame for direct sequence spread spectrum and high rate direct sequence spread spectrum as defined by 802.11.

FIG. 1d is a block diagram 140 illustrating a PLCP frame for direct sequence spread spectrum and high rate direct sequence spread spectrum (HR-DSS) as defined by 802.11. Referring to FIG. 1d, there is shown preamble 142, PLCP header 144 and MPDU 146. Preamble 142 may include synchronization (SYNC) data 142a and synchronization delimiter 142b. The PLCP header 144 may include PCLP signal field (PSF) 144a, service data 144b, length 144c, and CRC field 144d. The SYNC data 142a may be 128 bits as compared to 8 bits for SYNC data 132a for frequency hopping spread spectrum. The CRC 144d is 16 bits, which is similar to CRC 134c for frequency hopping spread spectrum.

Figure 1E:
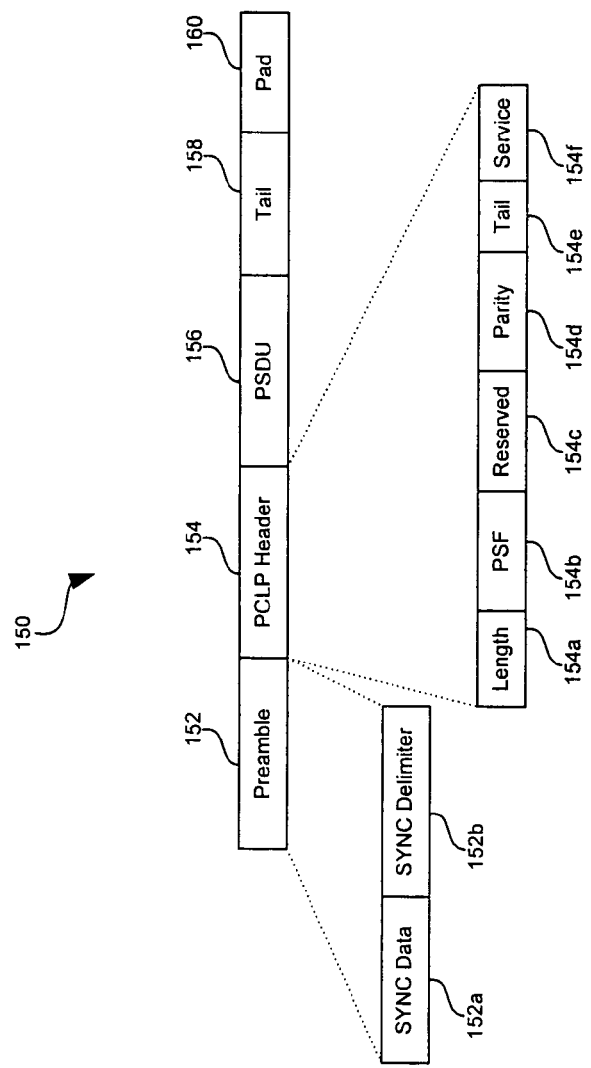
FIG. 1e is a block diagram illustrating a PLCP frame for orthogonal frequency division multiplexing as defined by 802.11.

FIG. 1e is a block diagram 150 illustrating a PLCP frame for orthogonal frequency division multiplexing as defined by 802.11. Referring to FIG. 1e, there is shown preamble 152, PLCP header 154 and PSDU 156, tail 158 and pad 160. Preamble 152 may include synchronization (SYNC) data 152a and synchronization delimiter 152b. The PLCP header 154 may include length 154a, PCLP signal field (PSF) 154b, reserved field 154c, parity 154d, tail 154e and service 154f. The length 154a is a 12-bit field that may be adapted to indicate the length of the frame. The PSF 154b is a 4-bit field that may indicate a modulation scheme utilized and its associated coding rate of the PSDU. For example, the specification utilizes binary 1011 to represent 6 Mbps, 1111 to represent 9 Mbps, 610 to represent 12 Mbps, 710 to represent 18 Mbps, 1001 to represent 24 Mbps, 1011 to represent 36 Mbps, 600 to represent 48 Mbps and finally, 700 to represent the maximum standardized rate if 54 Mbps. The reserved field 154c is a 1 bit field that is reserved for future use and may be adapted for application specific use. The parity field 154d may indicate odd or even parity. The tail field 154e is a 6-bit field. The service field 154f is a 16-bit field that may be adapted to indicate the type of service.

In a typical wireless local area network, especially as access devices become mobile throughout the network, channel capacity may be rapidly time varying. For example, when the distance from an access device to an access point increases or decreases due to mobility, the channel capacity and ultimately the channel throughput may change with time. In accordance with an embodiment of the invention, a switch is provided to facilitate communication between one or more of a plurality of access devices and/or access points, and/or other switches. The switch may utilize a messaging protocol, which may be adapted to facilitate tasks such as, access point aggregation and resiliency, switch filter transfer, bandwidth management, session control and management, load balancing and/or QoS control and management.

Referring to the task of access point aggregation and resiliency, in a hybrid wired/wireless LAN in which bandwidth usage may be rapidly changing over time due to the mobility of access devices, the switch, in accordance with an aspect of the invention, may be configured to access point aggregation and resiliency for a wired and/or a wireless portion of the network. The task of access point aggregation and resiliency may operate dependently or independently of activities including, but not limited to, allocating and de-allocating bandwidth, implementing policies, tracking bandwidth usage and adapting bandwidth allocation to meet user demands and system capability. One or more available switch ports configured for the resilient operation, also shares the common system capabilities. By doing so, upon the detection of the failure of the connection to the default switch port, all services associated with the default switch port connection is assigned to secondary switch port for the resilient operation. The management of these activities may be directly or indirectly related to providing mobility and operability throughout a wired or wireless LAN, or a hybrid combination thereof.

Figure 2:
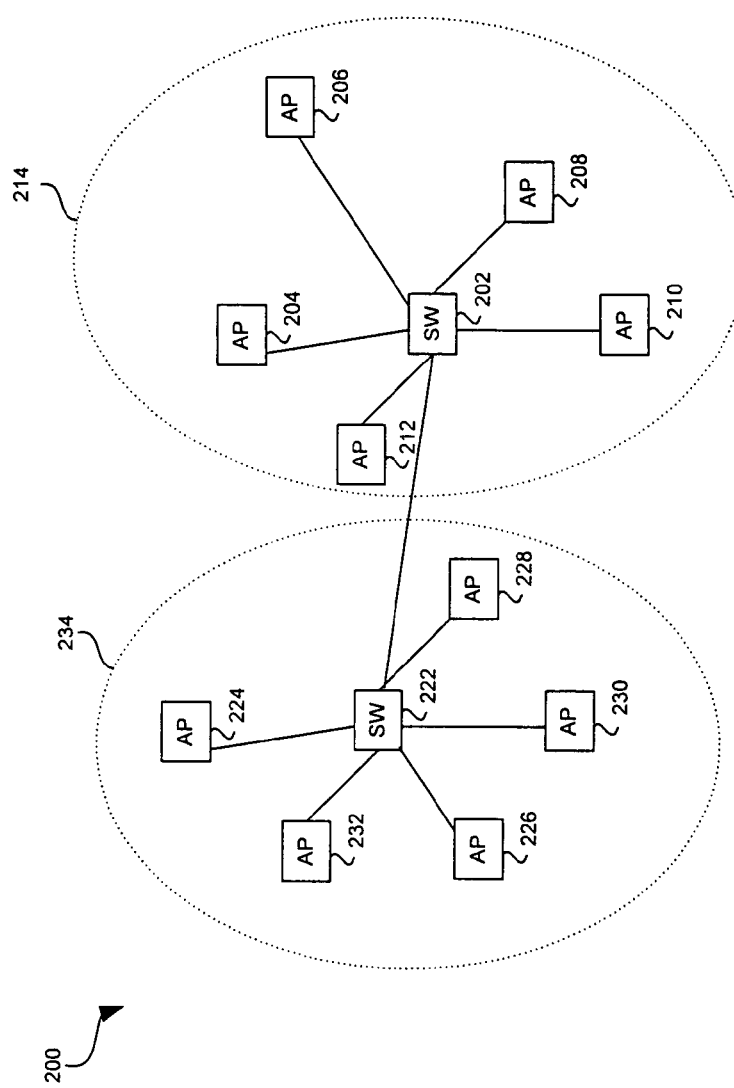
FIG. 2 is a block diagram of an exemplary wireless local area network in accordance with an embodiment of the invention.

FIG. 2 is a block diagram of an exemplary wireless local area network in accordance with an embodiment of the invention. Referring to FIG. 2, there is illustrated a first networking domain 214 and a second networking domain 234. The first networking domain 214 may include a switch 202, and access points 204, 206, 208, 210, 212. Each of access points 204, 206, 208, 210, 212 may be coupled to the switch 202. The second networking domain 234 may include a switch 222, and access points 224, 226, 228, 230, 232. Each of access points 224, 226, 208, 230, 232 may be coupled to the switch 222. Switch 222 may be coupled to switch 202 through any one or more of a wired and a wireless medium. Although not shown, at least some of the access points in any one of the networking domains 214, 234 may be coupled to each other. Notwithstanding, a plurality of actual and/or virtual channels may be provided to facilitate communication with the access points and switches. Although the networking domains 214 and 234 are illustrated as separate networking entities, the invention is not so limited. Accordingly, the networking domain 214, 234 may be part of a single networking entity, but may represent separate security domains within the single networking entity.

In operation, any one or more of the switches 202, 222 may be adapted to send network management related information and parameters to any one or more of the access points in any one or more of the networking domains 214, 234. In one embodiment of the invention, for example, switch 202 may be adapted to communicate bandwidth information to access point 206. Similarly, switch 202 may be adapted to send network management related information to any one or more of access points 204, 206, 208, 210, 212. Similarly, switch 222 may be adapted to communicate network management related information to any one or more of access points 224, 226, 228, 230, 232. The bandwidth information and/or network management related information may be used by an access point to efficiently allocate and/or de-allocate bandwidth for associating and/or dissociating access devices.

The switches 202, 222 may be adapted to provide, for example, certain QoS management activities to the access points using for example a messaging protocol. Accordingly, some activities such as bandwidth policing, bandwidth management, load balancing, roaming and handover may be handled by coordinating one or more switches and one or more access points utilizing, for example, the messaging protocol. Notwithstanding, a switch for example, switch 222, may be configured to establish rules that may be adapted by the access points 224, 226, 228, 230, 232 in carrying out these activities. The rules may be propagated from the switches 222, 202 to the access points 204, 206, 208, 210, 212, 224, 226, 228, 230, 232 using, for example, the messaging protocol.

Prioritization and processing, for example, may be based on acceptable levels of latency and bandwidth availability. For example, an IP telephone call may be assigned highest queuing and processing priority in order to minimize latency. Policing, for example, may include performing activities which may limit and control the usage of available bandwidth by a particular access device or a type of access device. These and other tasks may be controlled by the switch using the messaging protocol. Although activities such as policing, bandwidth and QoS management may be conducted independently of access point aggregation and resiliency, in accordance with an aspect of the invention, QoS management related information may be utilized for bandwidth management.

In operation, any one or more of the access points in any one or more of the networking domains may be adapted to acquire various bandwidth related information and parameters and communicate the bandwidth related information to one or more of the switches 202, 222. For example, access point 206 may be adapted to acquire various bandwidth related information and communicate the acquired information back to the switch 202. Similarly, any one or more of access points 204, 206, 208, 210, 212 may acquire various bandwidth related information and parameters and communicate the acquired information to switch 202. In another aspect of the invention, any one or more of access points 224, 226, 228, 230, 232 may acquire various bandwidth related information and parameters and communicate the acquired information to the switch 222.

Any one or more of access points 224, 226, 228, 230, 232 may acquire various bandwidth related information and parameters and communicate the acquired information to the switch 202 through switch 222. This may be particularly useful in, for example, a roaming scenario or handoff scenario. In both the roaming and handoff scenarios where a particular access device is roaming or being handed off from networking domain 234 to networking domain 214, it may be advantageous to acquire bandwidth related information pertaining to networking domain 214 before permitting an access device to acquire service from networking domain 214. In this case, switch 222 may initiate a query requesting bandwidth related information from switch 202. Consequently, switch 202 may request bandwidth related information from any one or more of access points 204, 206, 208, 210, 212. Once switch 202 gets the bandwidth related information from these access points, it may communicate the information to the switch 222. Accordingly, the switch 222 may decide whether to handoff or permit roaming depending on the bandwidth related information received from the switch 202.

Based on bandwidth related information received from one or more access devices or switches, a switch may be adapted to force an access device to roam. For example, in a case where the switch determines that there may be insufficient bandwidth or channel capacity, then the switch may be adapted to dynamically force existing and/or new incoming access devices to roam. In one aspect of the invention, a list of devices which have been forced to roam may be maintained. Accordingly, if a switch determines that there is sufficient channel capacity available, then the switch may be adapted to signal or notify devices on the list to reattempt establishment of service and permit access to the service provided by the network. In this regard, any one or more of the switches 202, 222 may be adapted to determine the total available bandwidth for any one or more of a plurality of access points and/or switches. Accordingly, the switches 202 and/or 222 may provide channel/frequency management and quality of service (QoS) management in order to optimize bandwidth utilization for a plurality of access devices.

Based on various bandwidth related information, an access prioritization scheme may be adapted and enforced by, for example, any one or more of the switches 202, 222. The prioritization scheme may include, establishing a priority for all network traffic, honoring prioritized traffic from all clients, and/or honoring prioritized traffic from some select clients such as trusted clients. In another aspect of the invention, the switches 202, 222 may be adapted to provide certain QoS management activities to the access points. Accordingly, some activities such as bandwidth policing, bandwidth management, packet prioritization and processing, and service type queuing may be handled by an access point. Notwithstanding, a switch may be adapted to establish rules that may be utilized by the access points in carrying out these activities. Prioritization and processing, for example, may be based on acceptable levels of latency and bandwidth availability. For example, an IP telephone call may be assigned highest queuing and processing priority in order to minimize latency. Policing, for example, may include tasks which limit and control the usage of available bandwidth by a particular access device or a type of access device.

The switch may utilize the messaging protocol (MP) to provide enhanced communication services to one or more of a plurality of access devices or mobile stations in, for example, an enterprise Wireless LAN (WLAN). The enhanced communication, in addition to ordinary WLAN device communication such as authentication, authorization, key exchanges, beacon broadcast, etc., may provide additional features not provided by a WLAN to its clients. These additional features may include, but are not limited to, bandwidth management, access control, load balancing, network management and quality of service. In addition to switches, other enterprise WLAN devices that may utilize messaging protocol message transactions may include but are not limited to, wireless access points, enterprise switches and wireless stations. These devices may be messaging protocol enabled in certain instances.

In accordance with an aspect of the invention, an exemplary WLAN Architecture may be provided. In the enterprise Wireless LAN environment, the wireless devices may be located at the edge of the network. The wireless devices may be connected or coupled to the enterprise network via the one or more access points, which in turn may be the edge devices of, for example, a wired LAN. The access points may be connected to the LAN via switches. These switches, which may be called wireless LAN switches, and in certain instances, may not only perform Layer 2 switching, but may be adapted to function as a wireless edge manager. They may also provide additional functionalities such as access point aggregation and resiliency, bandwidth management, access control, firewall functions, traffic privacy and quality of service (QoS), network management, and load balancing.

Figure 3:
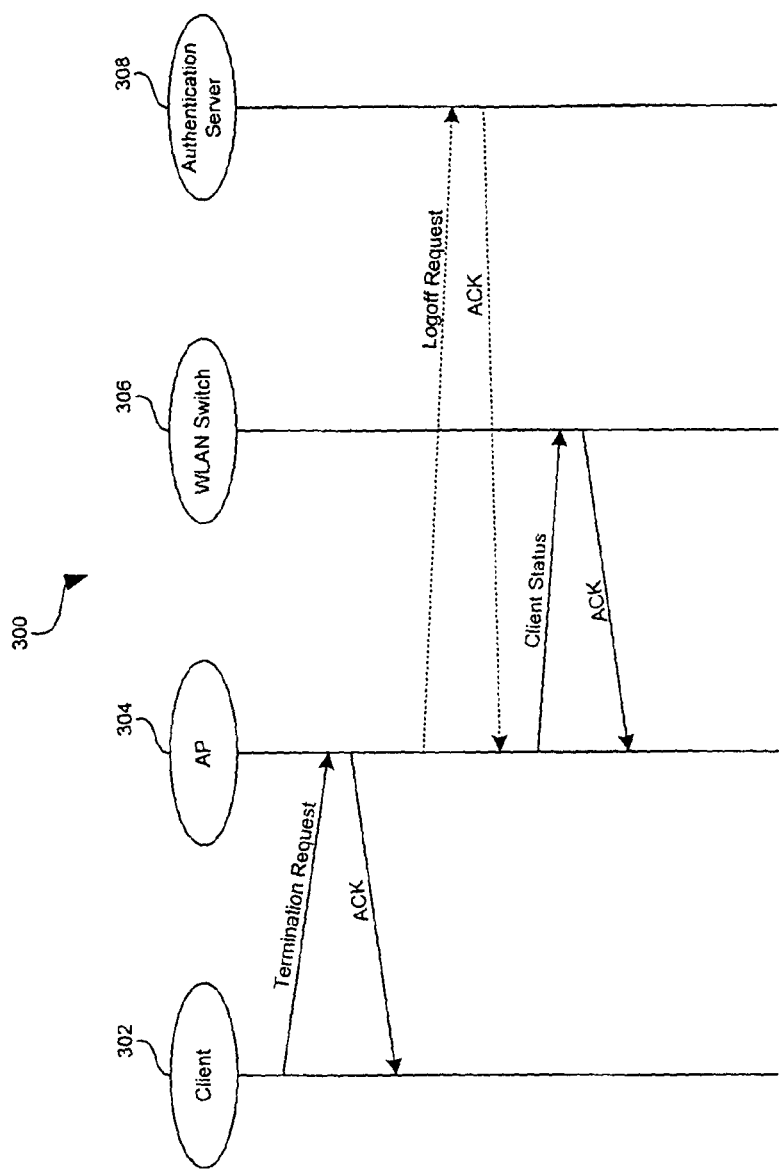
FIG. 3 illustrates an exemplary session termination in accordance with an embodiment of the invention.

FIG. 3 illustrates an exemplary session termination 300 in accordance with an embodiment of the invention. Referring to FIG. 3, the session termination may include interaction between one or more of a client 302, an access point (AP) 304, a WLAN switch (WS) 306 and an authentication server (AS) 308. The session termination may occur as a client logoff procedure, an idle session termination, access policy violation termination or by an act initiated by for example, a network administrator.

Referring to FIG. 3, the client 302 may send a logoff request to AP 304. The AP 304 may acknowledge the request with an ACK. The AP 304 may send a logoff request to the AS 308. The AS 308 may also respond with an ACK. The AP 304 may send a client status of logoff to the WS 306. The WS 306 may send and ACK to the AP 304. The WS 306 may cleanup any session information established for the client 302. In one aspect of the invention, the ACK and the client status may be sent using the messaging protocol (MP). The other messages may be sent using, for example, an extensible authentication protocol (EAP). The EAP from 802.1x may be utilized for session authentication, and the MP may facilitate communication between the AP 304 and WLAN switch 306. WS 306 may be adapted to request data for some or all communication sessions currently associated with an AP.

A handoff may be a pseudo session initiation/termination, but without a need for authentication. Handoff may be triggered by detection of a strong new signal and degradation of an old signal, in addition to receiving a broadcast beacon of a new AP. In an Enterprise WLAN, for example, there may be two types of handoff, namely intra-switch which may involve handoff between two APs that may be connected to the same WLAN switch, and inter-switch handoff which may involve handoff between two APs that may be connected to different WLAN switches. Inter-switch handoff may involve transferring information between the two switches.

Figure 4:
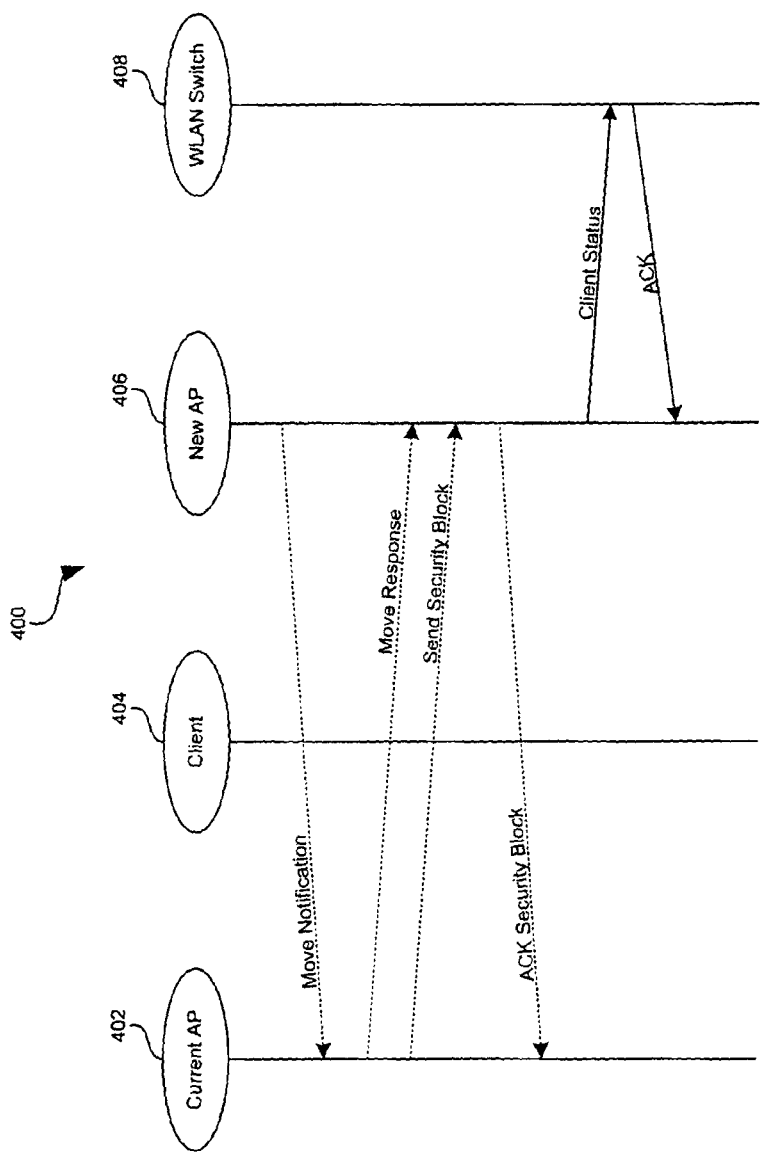
FIG. 4 illustrates an exemplary intra-switch handoff scenario in accordance with an embodiment of the invention.

FIG. 4 illustrates an exemplary intra-switch handoff scenario 400 in accordance with an embodiment of the invention. Referring to FIG. 4, there is shown a current access point (AP) 402, a client 404, a new access point (AP) 406, and a switch 408. In operation, client 404 may send a request to current AP 402 for disassociation from AP 402 and association with new AP 406. The new AP 406 may send a Move Notification message to the current AP 402. The current AP 402 may respond with a Move Response message which may include Session Context. The current AP 402 may also send the client's 404 security related data which may include, but is not limited to, an encryption key to the new AP 406. The new AP 406 may acknowledge with for example, an acknowledgement of the security block with for example, an ACK Security Block message. The new AP 406 may send client status information which may include handoff information to WLAN Switch 408. The WLAN switch 408 may transfer switching information from one port connecting the current AP 402 to another port which now connects the new AP 406. In one aspect of the invention, the client status and ACK messages may be messaging protocol messages. The term current AP refers to the previously connected access point and new AP refers to the currently connected AP. Similarly, the term current switch refers to the previously connected switch and new switch refers to the currently connected switch.

Figure 5:
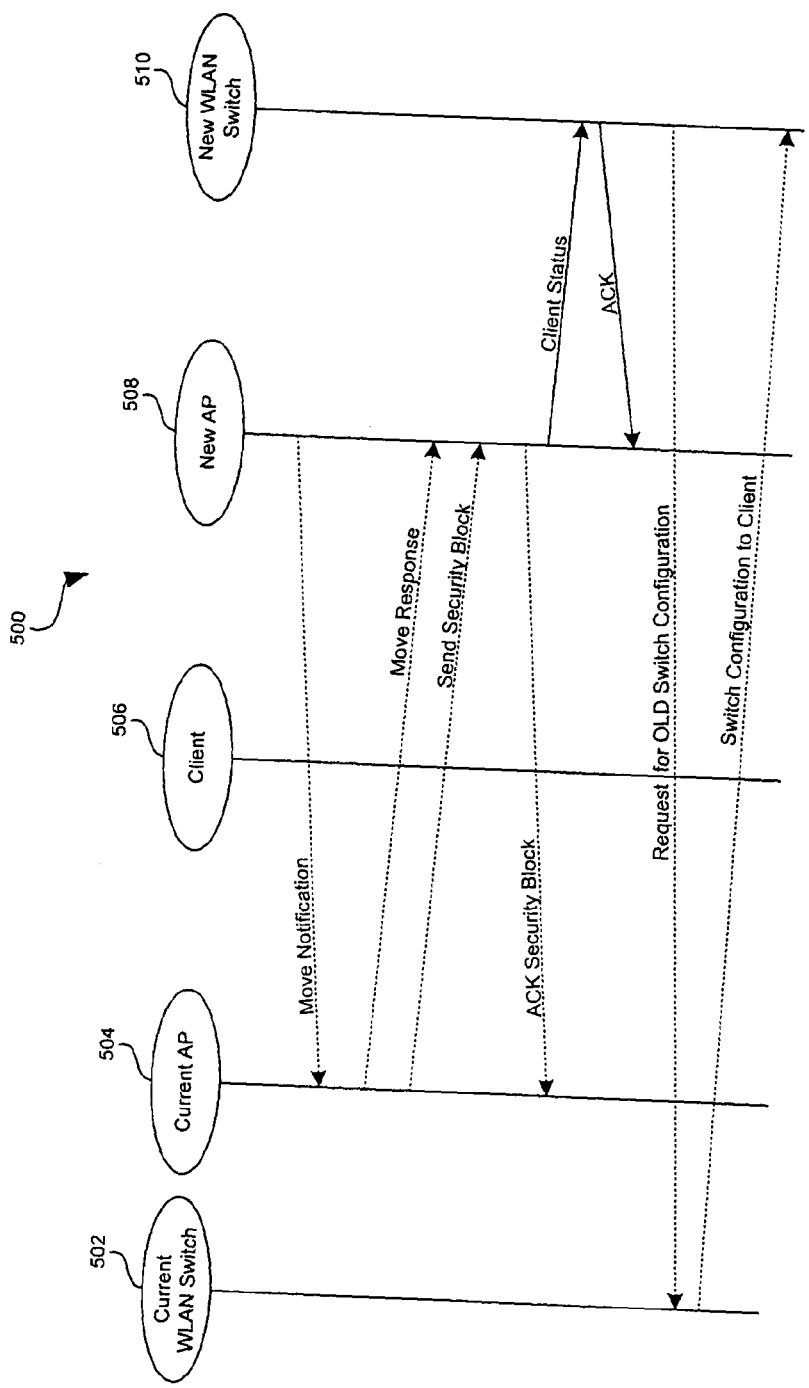
FIG. 5 illustrates an exemplary inter-switch handoff scenario in accordance with an embodiment of the invention.

FIG. 5 illustrates an exemplary inter-switch handoff scenario 500 in accordance with an embodiment of the invention. Referring to FIG. 5, there is shown an current WLAN switch 502, an current access point (AP) 504, a client 506, a new access point (AP) 508, and a new WLAN switch 510. In operation, client 506 may send a request to the current AP 504 for disassociation from current AP 504 served by current switch 502 and for an association with the new AP 508 served by the new switch 510. The new AP 508 may send a notification message such as a Move Notification message to the current AP 504. The current AP 504 may respond with a message such as a Move Response with a session context. The current AP 504 may send security data for client 506, for example an encryption key, to the new AP 508. The new AP 508 may acknowledge with an ACK message. The new AP 508 may send client status data for handoff to the new WLAN switch 510. The new WLAN switch 510 may issue a request for switch configuration for client 506 from current WLAN switch 502. The current WLAN switch 502 may respond with at least the requested switch configuration for client 506. The new WLAN switch 510 may be adapted to enable switching intelligence, which may include, but is not limited to, QoS, access policy for the client 506. In one aspect of the invention, the client status, request for switch configuration, switch configuration and the ACK message sent from the new AP 508 to the new WLAN switch 510 may be messaging protocol messages.

Figure 6:
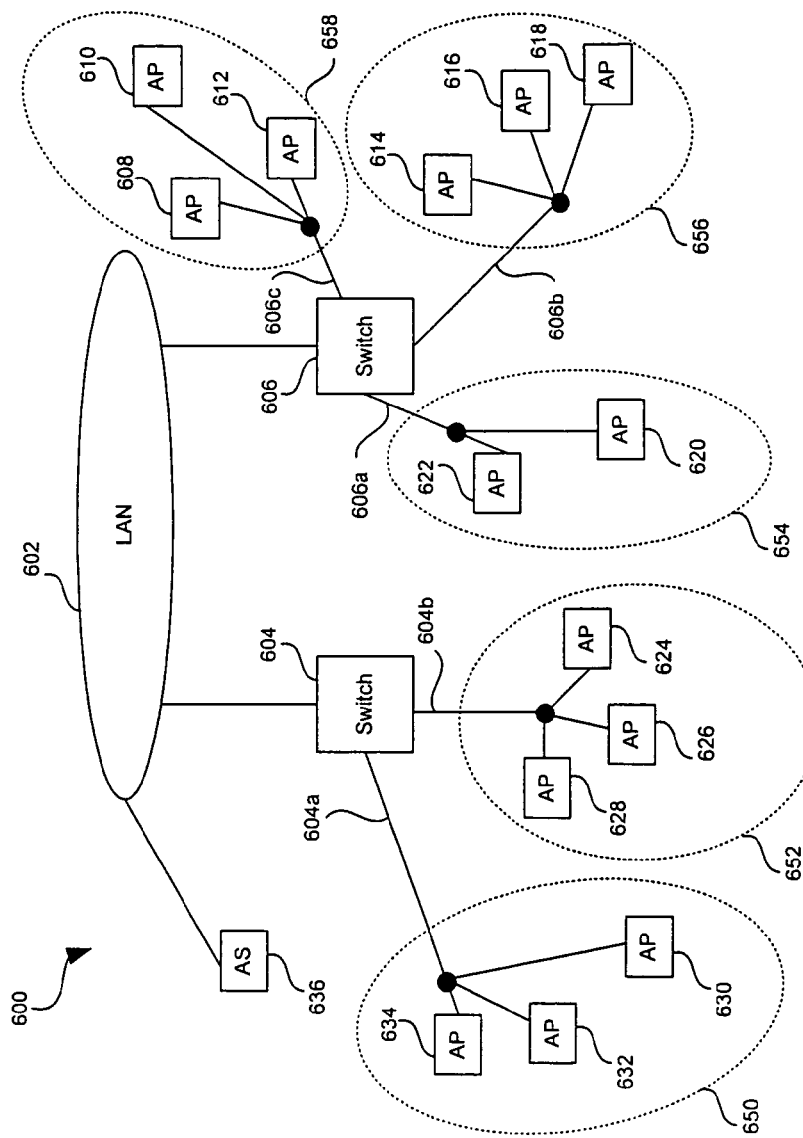
FIG. 6 is a block diagram of exemplary system for access point aggregation and resiliency in a WLAN in accordance with an embodiment of the invention.

FIG. 6 is a block diagram 600 of an exemplary system for access point aggregation and resiliency in a WLAN in accordance with an embodiment of the invention. Referring to FIG. 6, there is shown a local area network (LAN) 602, authentication server 636, switches 604, 606. Switch 604 may be coupled to a first trunk or trunk group 604a, which may provide connectivity for access points 634, 632, 630. Switch 604 may be coupled to a first trunk or trunk group 604a, which may provide connectivity to APs 634, 632, 630. Switch 604 may also be coupled to a second trunk or trunk group 604b, which may provide connectivity to APs 628, 626, 624. Switch 606 may be coupled to a first trunk or trunk group 606a, which may provide connectivity to access points 622, 620. Switch 606 may also be coupled to a second trunk or trunk group 606b, which may provide connectivity to APs 614, 616, 618. Finally, switch 606 may be coupled to a third trunk or trunk group 606a, which may provide connectivity to APs 608, 610, 612.

A group of access points may be aggregated based on different criteria, including but not limited to, location and/or functionality. Access points 634, 632, 630, may be aggregated to form a group, for example group 650. Access points 624, 626, 628 may be aggregated to form a group, for example group 652. Accordingly, groups 650, 652 may be served by switch 604. Access points 620, 622 may be aggregated to form a group, for example group 654. Access points 614, 616, 618 may be aggregated to form a group, for example group 656. Similarly, access points 608, 610, 612 may be aggregated to form a group, for example group 658. Accordingly, groups 654, 656 and 658 may be served by switch 606.

In accordance with an aspect of the invention, each of the trunks 606a, 606b, 606c of switch 606 and trunks 604a, 604b may be adapted to transport data for a particular group of access points. Since access points may be functionally aggregated or grouped, various operational policies and/or procedures related to a particular group may be distributed in a centralized manner using one or more switch trunks or trunk groups. In this regard, various security and access polices related to roamers may be uniformly implemented. Additionally, the WLAN may have the capability to adjust to and/or recover from particular events. For example, the access points 608, 610, 612 in group 658 may be arranged in, for example, a particular section of a building such as a conference room, in order to provide service to conference participants. In this case, whenever a conference is in progress, addition ports may be provisioned to provide adequate coverage to conference participants. More particularly, additional ports may be provisioned from one or more logical switches within switch 606, thereby providing additional links for trunk group 606c to carry additional traffic. The provisioning of additional links may be achieved dynamically or the links may be manually provisioned. At the end of the conference, since there may not be a need for additional capacity and the previously provisioned link may be decommissioned and provisioned to provide additional capacity elsewhere.

In another embodiment of the invention, the groups of access points may be manually and/or dynamically configured to provide flexibility in distributing various policies and/or operational procedures to the APs serviced by a switch. In this regard, one or more ports may be provisioned in order to appropriately distribute information to various access points. For example, group 650 and 652 may be part of an enterprise network served by switch 604. Notwithstanding, there may be different operation policies and/or procedures that may be associated with each of groups 650 and 652. Accordingly, it may be necessary to provide different policies to group 650, which includes access points 630, 632, 634 and group 652, which includes access points 624, 626 and 628. In order to facilitate dynamic configuration of the groups, one or more software applications associated with the switch may be adapted to provision the trunks that may serve particular groups.

In another aspect of the invention, in a case where there may be a link failure within a particular trunk group, port switching may be used to decommission one or more failed ports and to commission one or more new switch ports to handle at least a portion of the traffic capacity previously handled by the failed port. A link failure is detected by the IEEE 802.3 Link Integrity Test, IEEE 802.3af Power over MDI power status, configuration change via network management, or other means that prevents communication. Port switching may be adapted to occur dynamically or manually. For example, in a case where some of the links on trunk group 606b have failed, the failed ports on switch 606 servicing those links may be decommissioned. Additional ports may be provisioned to provide adequate coverage for access points 614, 616 and 618. In certain instances, it may be necessary to take underutilized and/or unutilized ports previously provisioned for trunk group 606c and re-provision them to provide additional capacity. In a case where there may be insufficient ports available, any underutilized and/or unutilized ports previously provisioned for trunk group 606a may be re-provisioned to provide additional capacity. In an alternative embodiment of the invention, a reserved pool of spare ports may be maintained and available spare ports may be provisioned to compensate for the failed links. Where the provisioned spare ports are no longer needed, they may be de-allocated and returned to the reserved pool of spare ports.

Figure 7:
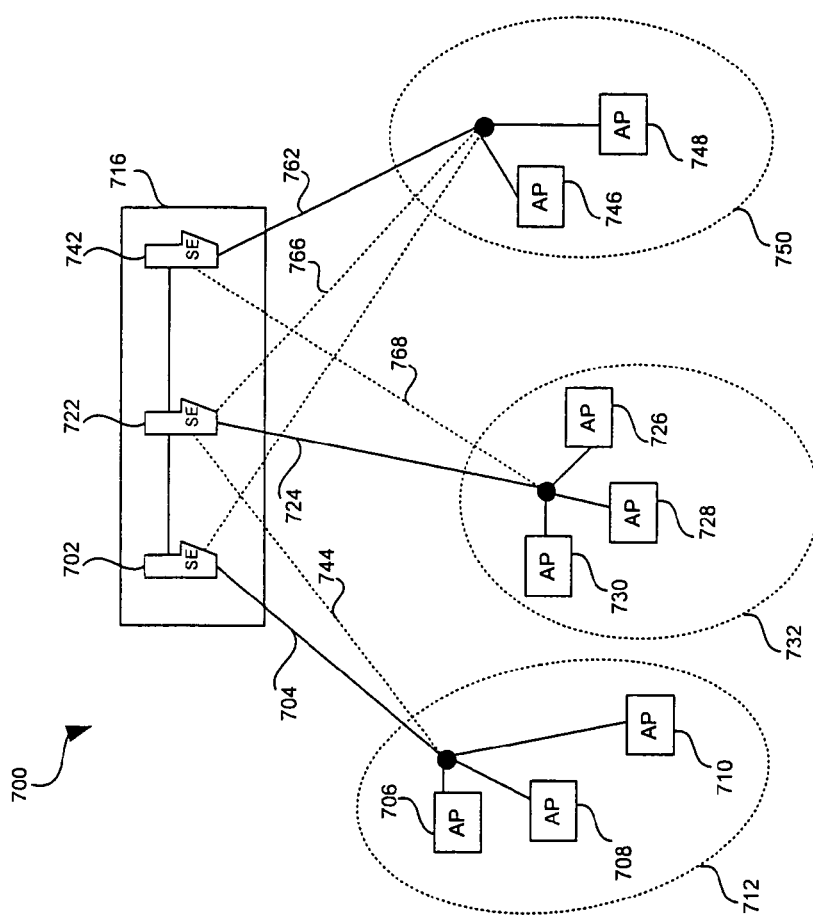
FIG. 7 is a block diagram illustrating access point aggregation and resiliency in the WLAN of FIG. 6 in accordance with an embodiment of the invention.

FIG. 7 is a block diagram 700 illustrating access point aggregation and resiliency in the WLAN of FIG. 6 in accordance with an embodiment of the invention. Referring to FIG. 7, there is shown a local area network switch 716 having switching elements 702, 722, 742. Switching element 702 may be coupled to trunk 704, which may provide connectivity to access points 706, 708 and 710. Switching element 722 may be coupled to trunk 724, which may provide connectivity to access points 726, 728 and 730. Switching element 742 may be coupled to trunk group 762 providing connectivity to access points 746 and 748. Access points 706, 708, 710 may be aggregated to form a group, namely group 712. Access points 726, 728, 730 may be aggregated to form a group, namely group 732. Finally, access points 746 and 748 may be aggregated to form a group, namely group 750. Accordingly, groups 712, 732 and 750 may be served by switch 716.

In operation, trunk 704 may be a default trunk that provides service for access points 706, 708 and 710, and trunk 724 may be a default trunk that provides service for access points 730, 728, and 726. Finally, trunk 762 may be a default trunk that provides service for access points 746 and 748. If any one or more of the access points in group 712 requires additional capacity, then one or more available ports of switching element 722 may be provisioned to provide service to group 712.

Accordingly, trunk group 744 may provide the additional capacity required by group 712. Similarly, if any one or more of the access points in group 732 requires additional capacity, then one or more ports of switching element 742 may be provisioned to provide service to group 732. Accordingly, trunk group 768 may provide the additional capacity required by group 732.

In a case where group 732 requires additional capacity above and beyond that which may be provided by trunk groups 724 and 768, then additional ports from switching element 702 may be provisioned to provide the additional capacity. In this regard, trunk group 762 may provide the additional capacity required by group 732. On the other hand, where groups 712 and 750 may require additional capacity that may be available from switching element 722, then trunk group 744 and 766 may be provisioned to provide the additional capacity.

Figure 8:
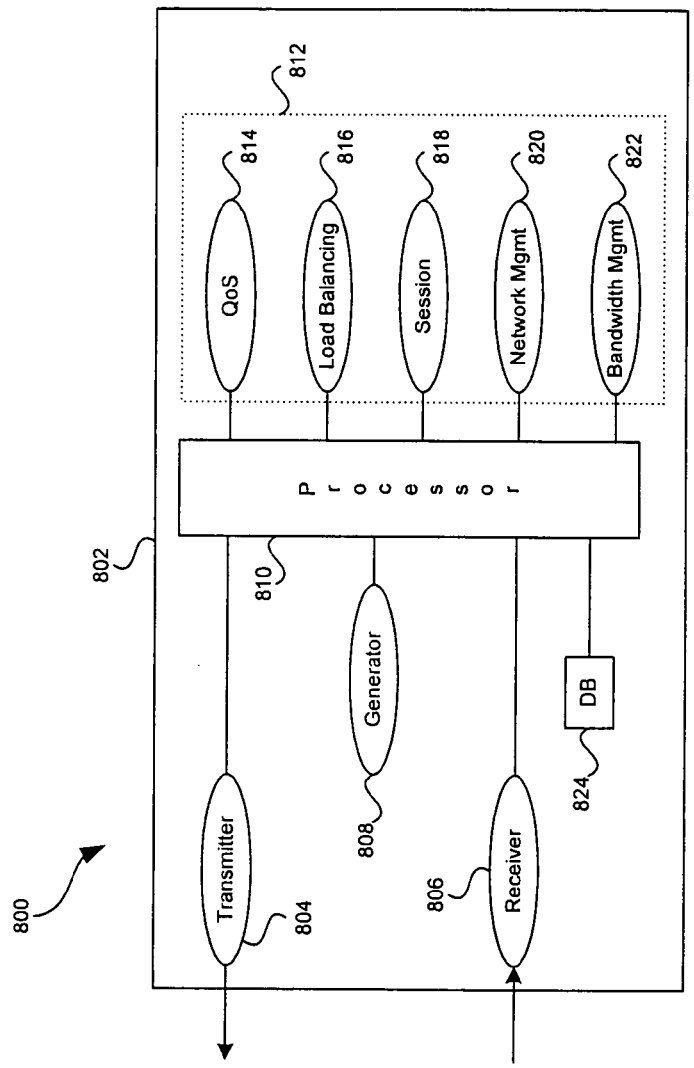
FIG. 8 is a block diagram of an exemplary switch as illustrated in FIG. 7 and FIG. 6 in accordance with an embodiment of the invention.

FIG. 8 is a block diagram 800 of an exemplary switch 802 as illustrated in FIG. 7 and FIG. 6 in accordance with an embodiment of the invention. Referring to FIG. 8, switch 802 may include a processor or switch processor 810, transmitter 804, receiver 806, generator 808, a database or memory 824 and controller 812. The controller 812 may include QoS controller 814, bandwidth controller 822, load balancing controller 816, session controller 818 and network management controller 820. The transmitter 804, receiver 806, generator 808 and the components of the controller 812, namely QoS controller 814, load balancing controller 816, session controller 818 and network management controller 820, may be variously coupled to processor 810.

The components of switch 802 may include suitable circuitry and/or software capable of implementing the various network management functions, including but not limited to, access point aggregation and resiliency, load balancing, QoS management, bandwidth management, session management and control. Notwithstanding, although the components of the switch 802 are individually shown, the invention is not limited in this regard. For example, with suitable software and/or logic, the generator function 808 may be implemented solely by the processor 810. Similarly, any one or more of the bandwidth management, QoS management, load balancing, session management and control, and network management may be integrated with suitable logic and/or software, may be executed by the processor 810.

In accordance with an aspect of the invention, the switch may be adapted to facilitate access point aggregation and resiliency. Switch processor 810, with suitable circuitry and/or software may be adapted to utilize information from transmitter 804, receiver 806, generator 808 and/or controller 812 to facilitate access point aggregation and resiliency. Additionally, switch processor 810 may utilize one or more messaging protocol messages to achieve access point aggregation and resiliency.

Switch processor 810 may determine an available switch port having a capability to handle a first access point group, which may have a first default switch port. The processor 810 may be adapted to provision the available switch ports to provide service to the first access point group 712 (FIG. 7). The switch processor 810 may be adapted to communicate information using the first default switch port and one or more provisioned switch ports. Switch processor 810 may have the capability to select one or more of the available switch ports from a reserved pool of available switch ports. Upon abatement of a need to utilize one or more of the provisioned switch ports, switch processor 810 may return the switch port to the reserved pool of available switch ports.

Switch processor 810 may be further adapted to select one or more available switch ports from the first switching element 702 (FIG. 7) and/or a second switching element 722. The first default switch port may be associated with the first switching element 702. The switch processor 810 may determine a second available switch port capable of handling a second access point group 732. The switch processor 810 may be adapted to provision at least a third available switch port to provide service to the second access point group 732. The switch processor 810 may be configured to switch between any two of the at least one available switch port, the second available switch port and the third available switch port. The switch processor 810 may be further adapted to utilize information from any of the QoS controller 814, bandwidth controller 822, load balancing controller 816, session controller 818 and network management controller 820, for access point aggregation and resiliency.

U.S. patent application Ser. No. 10/607,094 entitled "Communication System and Method in a Hybrid Wired/Wireless Local Area Network" filed on Jun. 26, 2003, discloses a messaging protocol that may be utilized by the switch in accordance with an embodiment of the invention, and is incorporated herein by reference in its entirety. Exemplary valid fields and subfields for various messaging protocol messages that may be utilized by the switch in accordance with an aspect of the invention are disclosed therein. The method and system disclosed therein may be adapted to utilize the messaging protocol to provide access point aggregation and resiliency in accordance with an embodiment of the invention.

U.S. patent application Ser. No. 10/658,410 entitled "Method and System for Providing an Intelligent Switch in a Hybrid Wired/Wireless Local Area Network" filed on Sep. 9, 2003, discloses a switch that may utilize the messaging protocol in accordance with an embodiment of the invention, and is incorporated herein by reference in its entirety. The switch disclosed therein may be adapted to utilize the messaging protocol to provide access point aggregation and resiliency in accordance with an embodiment of the invention.

U.S. patent application Ser. No. 10/658,514 entitled "Method and System for Network Management in a Hybrid Wired/Wireless Local Area Network" filed on Sep. 9, 2003, discloses a switch that may utilize the messaging protocol for network management in accordance with an embodiment of the invention, and is incorporated herein by reference in its entirety. The method and system disclosed therein may be adapted to utilize the messaging protocol to provide access point aggregation and resiliency in accordance with an embodiment of the invention.

U.S. patent application Ser. No. 10/658,725 entitled "Method and System for Providing and Intelligent Switch for Bandwidth Management in a Hybrid Wired/Wireless Local Area Network" filed on Sep. 9, 2003, discloses a switch that may utilize the messaging protocol for bandwidth management in accordance with an embodiment of the invention, and is incorporated herein by reference in its entirety. The method and system disclosed therein may be adapted to utilize the messaging protocol to provide access point aggregation and resiliency in accordance with an embodiment of the invention.

U.S. patent application Ser. No. 10/658,734 entitled "Method and System for Providing Optimal Load Balancing in a Hybrid Wired/Wireless Local Area Network" filed on Sep. 9, 2003, discloses a switch that may utilize the messaging protocol for optimal load balancing in accordance with an embodiment of the invention, and is incorporated herein by reference in its entirety. The method and system disclosed therein may be adapted to utilize the messaging protocol to provide access point aggregation and resiliency in accordance with an embodiment of the invention.

In accordance with another embodiment of the invention, dependent on the modulation scheme utilized, one or more of the PCLP frames illustrated in FIG. 1b, FIG. 1c, FIG. 1d and FIG. 1e may be adapted to contain information which may be utilized for access point aggregation and resiliency in a WLAN in accordance with various embodiments of the invention. Additionally, the PCLP frames may be adapted to convey information for any one or more of the 801.11a, 802.11b and 802.11g modes of operation utilized by access points and/or access devices in accordance the embodiments of the invention.

In light of the foregoing, certain aspects of the invention may provide a system and method for access point aggregation and resiliency in a hybrid wired/wireless local area network. Access point aggregation and resiliency may include determining an available switch port having the capability to handle a first access point group. The first access point group may have a first default switch port which it may utilize. At least one switch port may be provisioned to provide service to the first access point group. Accordingly, information may be communicated between the first default switch port the provisioned switch port, while maintaining client status and connection information. Available switch ports may be selected from a reserved pool of available switch ports and upon abatement of a need to utilize the provisioned switch ports, the provisioned switch ports may be returned to the reserved pool of available switch ports.

Accordingly, the present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method in a hybrid wired/wireless local area network, the method comprising:
   aggregating access points into groups by coupling a plurality of the access points to one or more network switches;
   determining availability of ports within the one or more network switches;
   determining capacity requirements of one or more of the aggregated access point groups;
   dynamically provisioning the ports for one or more of the aggregated access point groups based on the determined availability and capacity requirements; and
   commissioning or decommissioning one or more of the provisioned ports within the network switches.

2. The method according to claim 1 further comprising assigning a default port for the one or more aggregated access point groups in addition to the provisioned ports.

3. The method according to claim 1, wherein the provisioning is achieved manually.

4. The method according to claim 1, wherein the determining availability further comprises selecting at least one available port from a reserved pool of available ports within the one or more network switches.

5. The method according to claim 4 further comprising returning the selected port to the reserved pool of available ports upon the decommissioning of the provisioned port.

6. The method according to claim 1, wherein the aggregation of access points into groups is based on one or more of location or functionality.

7. A system for access point aggregation in a hybrid wired/wireless local area network, the system comprising:
   at least one processor configured to:
   aggregate the access points into groups by coupling a plurality of the access points to one or more network switches;
   determine availability of ports within the one or more network switches;
   determine capacity requirements for one or more of the aggregated access point groups; and
   dynamically provision the ports for one or more of the aggregated access point groups based on the determined availability and capacity requirements.

8. The system according to claim 7, wherein the dynamically provisioning the ports further comprises commissioning or decommissioning one or more ports within the network switches.

9. The system according to claim 7, wherein the at least one processor is further configured to determine the availability of ports by selection of at least one available port from a reserved pool of available ports.

10. The system according to claim 9, wherein the at least one processor is further configured to return the selection of at least one available port to the reserved pool of available ports upon a decommissioning of the provisioned port.

11. The system according to claim 7, wherein the at least one processor is further configured to aggregate the access points into groups based on one or more of location or functionality.

12. The system according to claim 7, wherein the at least one processor is further configured to assign a default port for the one or more aggregated access point groups in addition to the provisioned ports.

13. The system according to claim 7, wherein the at least one processor is at least one of a switch processor, a bandwidth management controller, a quality of service controller, a load balancing controller, a session controller or a network management controller.

14. A machine-readable storage, having stored there on a computer program having at least one code section for access point aggregation in a hybrid wired/wireless local area network, the at least one code section executable by a machine for causing the machine to perform:
- aggregating the access points into groups by coupling a plurality of access points to one or more network switches;
- determining availability of ports within the one or more network switches by selecting at least one available port from a reserved pool of available ports;
- determining capacity requirements for one or more of the aggregated access point groups; and
- provisioning the ports for one or more of the aggregated access point groups based on the determined availability and capacity requirements.

15. The machine-readable storage according to claim 14, wherein the provisioning ports further comprises commissioning or decommissioning one or more ports within the network switches.

16. The machine-readable storage according to claim 14 further comprising code for returning the ports to the reserved pool of available ports upon a decommissioning of the provisioned one or more ports.

17. The machine-readable storage according to claim 14 further comprising code for aggregating the access points into groups based on one or more of location or functionality.

18. The machine-readable storage according to claim 14 further comprising code to provision the ports dynamically.

19. The machine-readable storage according to claim 14 further comprising code to assign a default port for the one or more aggregated access point groups in addition to the provisioned one or more ports.

20. The system according to claim 7, wherein the provisioning is achieved manually.

* * * * *